United States Patent [19]

Herbulot et al.

[11] Patent Number: 4,508,199
[45] Date of Patent: Apr. 2, 1985

[54] BRAKE SHOE

[75] Inventors: Jean Herbulot, Franconville; Bernard Jumel, Pierrefitte, both of France

[73] Assignee: Valeo, Paris, France

[21] Appl. No.: 436,196

[22] Filed: Oct. 21, 1982

[30] Foreign Application Priority Data

Oct. 30, 1981 [FR] France .................................. 81 20442

[51] Int. Cl.³ ............................................. F16D 65/08
[52] U.S. Cl. .................................. 188/250 B; 188/73.1
[58] Field of Search ............. 188/73.1, 250 B, 250 G, 188/250 R; 192/107 R

[56] References Cited

U.S. PATENT DOCUMENTS

| 3,235,037 | 2/1966 | Peras | 188/250 B |
| 3,275,105 | 9/1966 | Petit | 188/250 B |
| 4,241,812 | 12/1980 | Burgdorf et al. | 188/250 B X |

FOREIGN PATENT DOCUMENTS

| 1575898 | 1/1970 | Fed. Rep. of Germany | 188/250 B |
| 2854344 | 6/1980 | Fed. Rep. of Germany | 188/250 G |
| 67062 | 6/1978 | Japan | 188/250 B |

Primary Examiner—Duane A. Reger
Attorney, Agent, or Firm—Young & Thompson

[57] ABSTRACT

A brake shoe having a support and a friction lining fixed to one face of the support. The support has, in its marginal region adjacent each side of the support abutting a lateral thrust shoulder, a protuberance projecting beyond the other face of the support. The protuberance is provided on only a portion of the extent of the marginal region and is devoid of friction lining, whereas the remainder of the extent of the marginal region is devoid of protuberance and is at least partly covered with friction lining.

11 Claims, 18 Drawing Figures

U.S. Patent  Apr. 2, 1985  Sheet 1 of 4  4,508,199
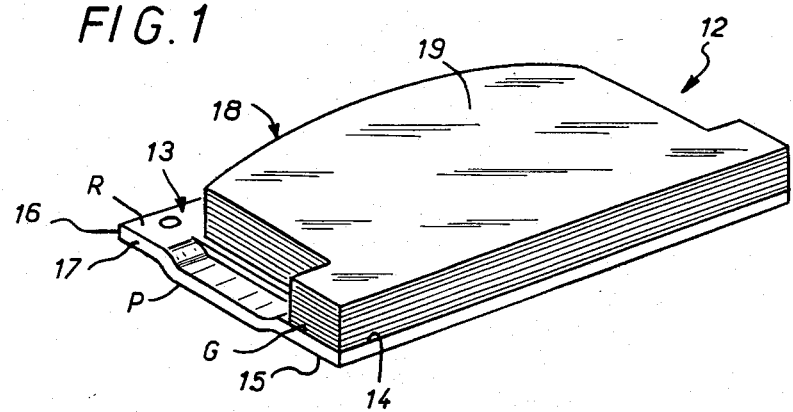
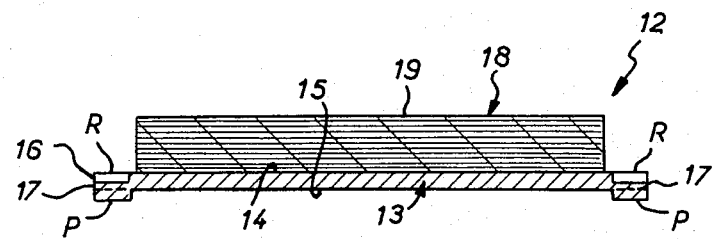
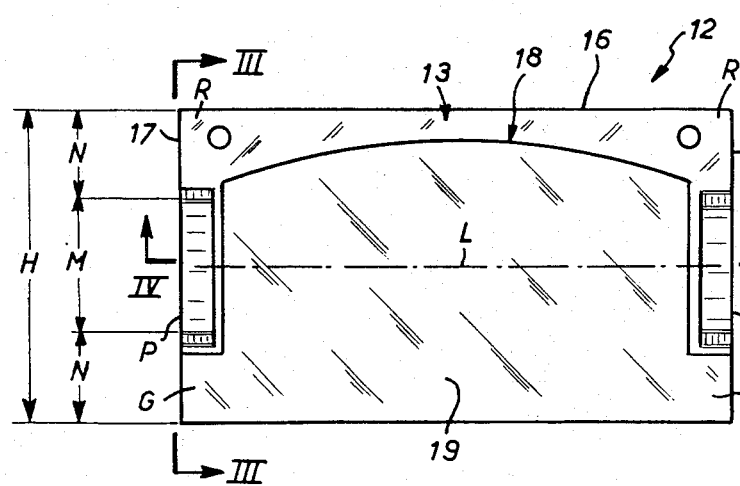
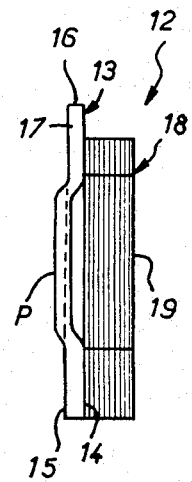

BRAKE SHOE

BACKGROUND OF THE INVENTION

The present invention relates to a brake shoe comprising a support having two opposite faces and a contour laterally exhibiting two opposite sides, a friction lining fixed to a first of the two faces of the support, said friction lining being adapted to cooperate frictionally with a rotary track in response to a clamping action exerted upon the second face of the support, each side of the support being adapted to cooperate in abutment against a lateral thrust shoulder.

When the shoe is new or lightly worn, the friction lining has a considerable thickness, with the result that it maintains the support sufficiently far from the rotary track for the side of the support always to find a correct abutment by the total thickness of that side, against the lateral thrust shoulder.

However, when the thickness of the lining has been considerably reduced by wear, it may occur that it no longer effects this correct positioning, and in this case it is possible for the side of the support to be applied against the thrust shoulder by only a part of its thickness, and it may escape completely from the thrust shoulder, which is worse.

The present invention relates more particularly to a brake shoe of the above-stated type, in which means are provided to prevent these defects, consisting in that the support exhibits in its marginal region adjacent to each side a protuberance projecting beyond the second face of the support, that is to say the face which is opposite the friction lining. Thus when the friction lining is heavily worn, this protuberance has the effect of maintaining correct contact between the side of the support and the lateral thrust shoulder.

However, these protuberances of the marginal regions of the support can cause inconvenience during the production of the shoes during baking of the shoes in the oven, when the shoes are stacked upon one another.

It is in fact important for this stacking to be effected by extensive contact zones in order to prevent deformations during pressure baking. This condition can no doubt be satisfied, despite the presence of the marginal protuberances, either by arranging wide chocks between the shoes, or by stripping the shoes marginally of lining. However, this results in a complication of production in the former case, and in a reduction of the friction performances of the shoe in the latter case.

The present invention has as its object a brake shoe of the above-stated type, which is free from these various disadvantages, the production of which is convenient, the positioning of which with reference to the lateral thrust shoulders remains correct even when the friction lining is worn, and in which the friction surface of the friction lining is very extensive, thus permitting excellent braking efficiency.

SUMMARY OF THE INVENTION

According to the invention, a brake shoe of the above-mentioned type is characterised in that the protuberance of the marginal region of the support adjacent to each side involves only a part of the extent of the marginal region, this part being devoid of friction lining, whereas the remaining part of the extent of said marginal region is devoid of protuberance and is covered with friction lining at least partly.

By virtue of this arrangement, the protuberances permit excellent positioning of the support with reference to the lateral stop shoulders even when the friction lining is worn, but do not prevent the shoes from being stacked by extensive interfaces during baking in the furnace. The friction lining covers a large area of the support, since it is not totally eliminated in the marginal regions.

Preferably, each protuberance is formed by a local deformation, straight or oblique, of the marginal region, realised by stamping or slashing, or again this protuberance is formed by a local extra thickness of the marginal region.

In an embodiment of the invention, a protuberance is provided on a median part of the extent of the marginal region, the extreme parts of which are devoid of protuberance, one of these extreme parts being covered with friction lining.

As a variant, two protuberances are provided on two intermediate parts of the extent of the marginal region, the median part and the extreme parts of which are devoid of protuberance, the median part and optionally one of the two extreme parts being likewise covered with friction lining.

BRIEF DESCRIPTION OF THE DRAWINGS

FIG. 1 is a perspective view of a brake shoe according to the invention;

FIG. 2 is an elevation of this brake shoe;

FIG. 3 is a side elevation of the shoe, according to the arrows III—III of FIG. 2;

FIG. 4 is a view of the brake shoe in section along the line IV—IV of FIG. 2;

DESCRIPTION OF THE PREFERRED EMBODIMENTS

First of all, reference will be made to FIGS. 1 to 7 which deal by way of example, without implying a limitation, with an application of the invention to a shoe for a disc brake, particularly for a motor vehicle.

Figure 5:
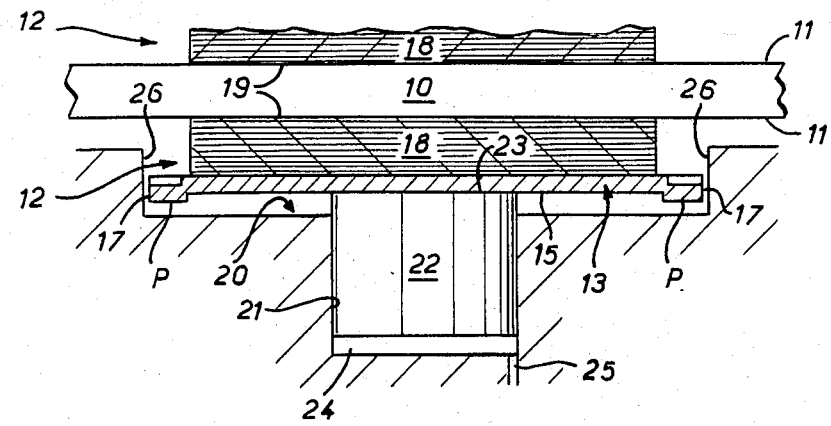
FIG. 5 shows schematically the shoe as assembled in a brake, the friction lining being new or lightly worn.

The disc of the brake, which is visible at 10 in FIG. 5, has two opposite rotary tracks 11 adapted to be frictionally engaged by two brake shoes 12.

Each brake shoe 12 comprises (FIGS. 1 to 4) a metallic support 13 of generally flat shape. The support 13 has two opposite faces 14 and 15 and a contour 16 laterally exhibiting two opposite sides 17. The shoe 12 has a friction lining 18 fixed to the face 14 of the support 13.

The friction lining 18 is adapted (FIG. 5) so that its free surface 19 cooperates frictionally against the corresponding rotary track 11 of the disc 10. It is through the face 15 of the support 13 that a clamping action is exerted upon the shoe 12 in order to apply it against the disc 10.

The brake (FIG. 5) comprises a stirrup 20 which surmounts the disc 10 and in which the shoes 12 are received. The stirrup forms the body of a cylinder 21, in which a piston 22 is fitted to slide. The piston 22 has an external face 23 by means of which it is capable of pushing against the face 15 of the support 13 of the shoe 12. The piston 22 defines in the cylinder 21, a control chamber 24 which is filled with hydraulic fluid. A duct 25 communicates with the chamber 24, through which duct a pressure can be built up in the chamber 24.

Figure 6:
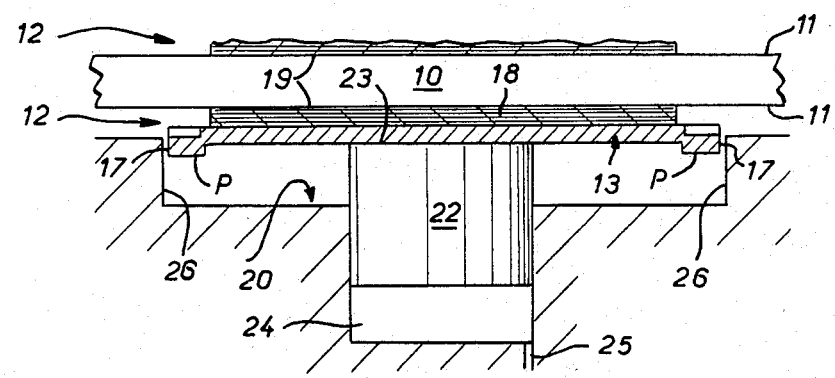
FIG. 6 is a similar view to FIG. 5, but in which the friction lining is heavily worn.

The stirrup 20 (FIG. 5) comprises lateral thrust shoulders 26 with which the sides 17 of the support 13 are intended to cooperate during use of the brake, in order to absorb the braking reaction. It is important for the sides 17 of the support 13 to be applied correctly against the lateral thrust shoulders 26, both when the friction lining 18 is new or little worn (FIG. 5) and when this friction lining 18 is heavily worn (FIG. 6).

For this purpose, the support 13 (FIGS. 1 to 4) is provided, at its marginal region R, which is adjacent to and extends substantially the full length of each side 17, with a protuberance P projecting beyond the face 15 of the support 13.

More particularly, this protuberance P involves only a part M (FIG. 2) of the extent H of the marginal region R, whereas the remaining part N of this extent H, which in the example of FIG. 2 is formed by two fractions arranged each side of the part M, is devoid of protuberance P and is covered with friction lining 18 at least partly at G. In the example of FIG. 2, the part M is median and the parts N are extreme. It is one of these parts N which is covered with friction lining 18 at G.

In the example of FIGS. 1 to 4, the protuberance P is formed by a deformation of the marginal region R, which is local, straight in shape, substantially flat, parallel to the faces 14 and 15, and obtained by stamping.

By virtue of the protuberance P, a correct abutment surface is made between the sides 17 of the support 13 and the lateral thrust shoulders 26, both when the lining 18 is new or lightly worn (FIG. 5) and when the lining 18 is heavily worn (FIG. 6).

Furthermore, because the protuberance P involves only a part of the extent H in one direction of the support 13, the production of the shoes 12 is facilitated. During baking in the furnace, the shoes 12 can be stacked by being applied against one another (FIG. 7) by means of a large flat interface S defined by the face 19 of the lining 18 of a shoe 12 and by the face 15 of the support 13 of the shoe 12 immediately above, which avoids this distortion without having to take particular precautions.

Moreover, the fact that one of the parts N devoid of protuberance P is covered with friction lining 18 at G makes it possible to give the lining 18 a large area, which produces excellent friction performance.

Figure 7:
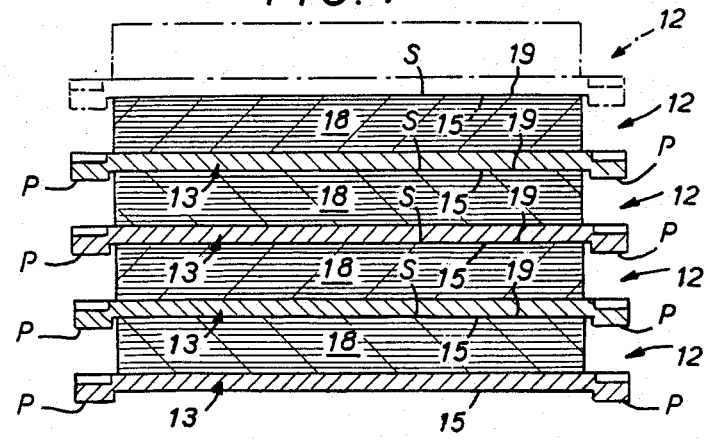
FIG. 7 shows a stack of shoes for baking in the furnace.
Figure 8:
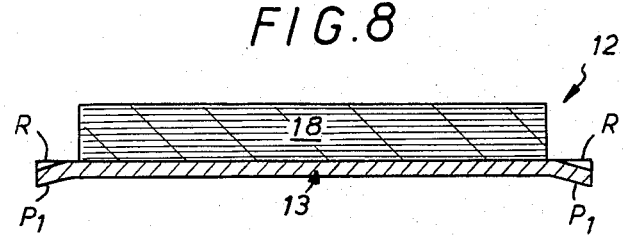
FIGS. 8 and 9 are views similar to FIG. 4, but deal with two variants respectively.

Reference will now be made to FIG. 8, where the arrangement is similar to that which has just been described with reference to FIGS. 1 and 7, but where each protuberance designated by P1 is formed by an oblique local deformation executed by stamping.

Figure 9:
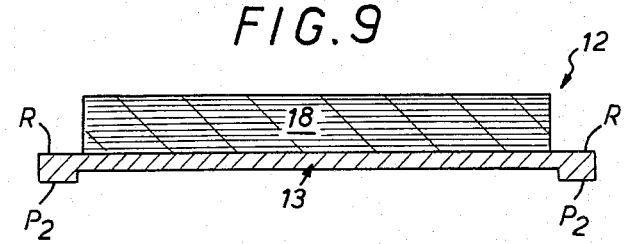

In another variant (FIG. 9) the protuberance, designated P2, is formed by a local extra thickness of the marginal region R.

In another variant (FIGS. 10 and 12), the arrangement is still similar to that which was described with reference to FIGS. 1 to 7, but the protuberances designated P3 are formed by local deformations of the marginal region R consisting of slashings C.

Figure 12:
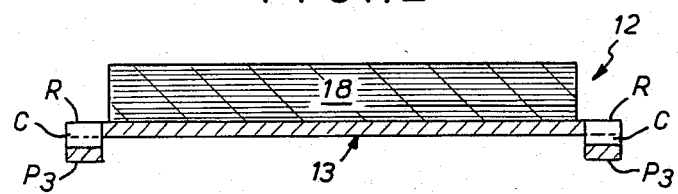
FIG. 12 is a view of this variant in section along the line XII—XII of FIG. 10.
Figure 15:
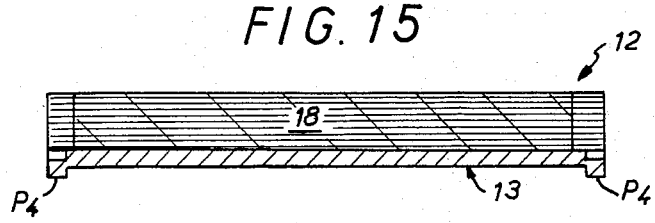
FIG. 15 is a view of this other variant in section along the line XV—XV of FIG. 13.
Figure 13:
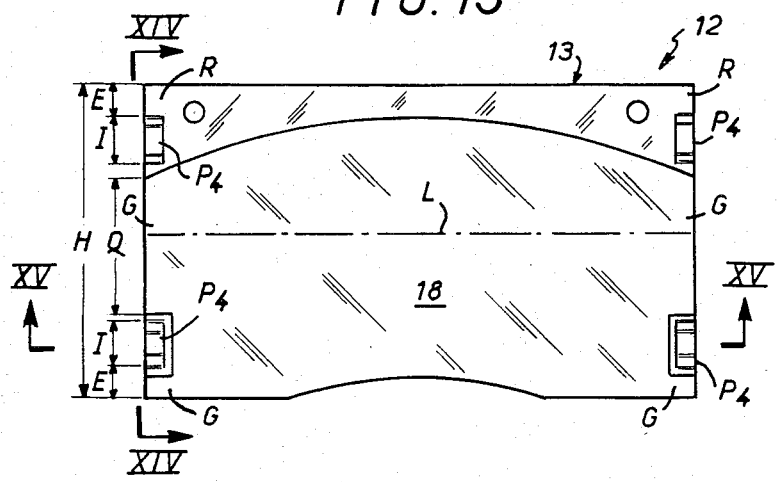
FIG. 13 is a view similar to FIG. 10, but deals with another variant.
Figure 14:
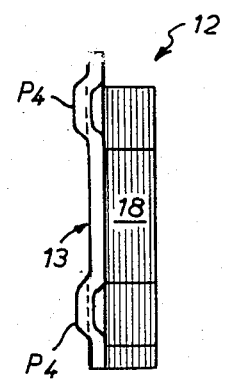
FIG. 14 is a side elevation of this other variant according to the arrows XIV—XIV of FIG. 13.

Reference will now be made to FIGS. 13 to 15, where the arrangement is still similar to that which was described with reference to FIGS. 1 and 7, and where protuberances, designated P4, are formed by local straight deformations of the marginal region R obtained by stamping, but here two protuberances P4 are provided on two intermediate parts I of the extent H of the marginal region, the median part Q and the extreme parts E of which are devoid of protuberance. This median part Q and the one of the extreme parts E are covered with friction lining 18 at G. As in the variant of FIGS. 10–12, in this variant there is a slit generally parallel to the lateral sides between each of the protuberances and the adjoining central part of the support.

Figure 10:
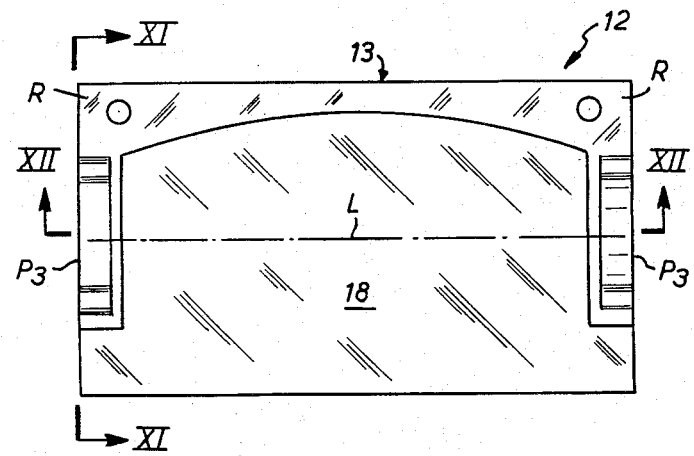
FIG. 10 is a view similar to FIG. 2, but deals with another variant of a brake shoe.
Figure 11:
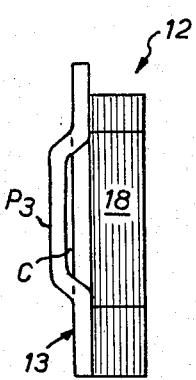
FIG. 11 is a side elevation of this variant, according to the arrows XI—XI of FIG. 10.

In another variant (FIGS. 16 to 18) the arrangement is similar to that which has just been described with reference to FIGS. 13 to 15, but the protuberances, designated P5, are realised not by stampings as in FIGS. 1 to 7, but by slashings C as in FIGS. 10 to 12.

Figure 18:
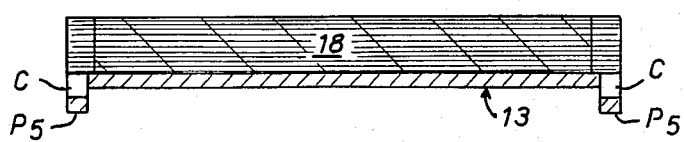
FIG. 18 is a view of this other variant in section along the line XVIII—XVIII of FIG. 16.
Figure 16:
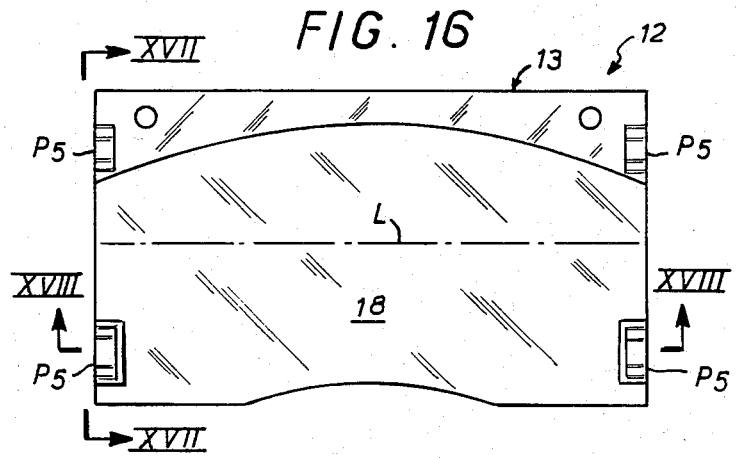
FIG. 16 is a view similar to FIG. 13 but deals with yet another variant of a brake shoe.
Figure 17:
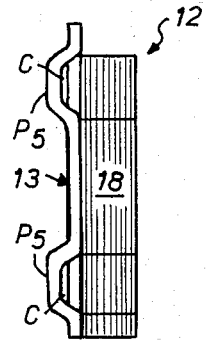
FIG. 17 is a side elevation of this other variant according to the arrows XVII—XVII of FIG. 16.

It will be appreciated that in the various embodiments which have been described with reference to FIGS. 1 to 7, to FIG. 8, to FIG. 9, to FIGS. 10 to 12, to FIGS. 13 to 15 and to FIGS. 16 to 18, the protuberances P, P1, P2, P3, P4 and P5 advantageously have a substantially symmetrical arrangement with reference to a median longitudinal line L of the lining 18 of the shoe 12. This arrangement permits balanced conditions of application of the sides 17 of the shoes 12 to the lateral thrust shoulders 26.

We claim:

1. A brake shoe comprising a support having opposite faces and a contour including two opposite lateral sides, a friction lining fixed to one of said faces of said support, said friction lining being adapted to cooperate frictionally with a braking surface in response to a force exerted on the other face of said support, each of said lateral sides of said support being adapted to abut against a lateral shoulder, said support having a marginal region extending substantially the full length of each of said lateral sides of said support, there being a protuberance in each of said marginal regions and protruding beyond the other of said faces of said support, said protuberances extending along only a portion of their respective marginal regions, said portions of said marginal regions being devoid of said friction lining, and at least part of the remainder of said marginal regions being covered with said friction lining.

2. A brake shoe according to claim 1, wherein said protuberances are local deformations in their respective marginal regions.

3. A brake shoe according to claim 1, wherein said protuberances are substantially flat and parallel to the faces of said support.

4. A brake shoe according to claim 1, wherein said protuberances are inclined with respect to the face of said support.

5. A brake shoe according to claim 2, wherein said protuberances are stamped deformations.

6. A brake shoe according to claim 2, wherein there is a slit generally parallel to the lateral sides between each of said deformations and the adjoining central part of said support.

7. A brake shoe according to claim 1, wherein said protuberances are extra thick portions of the respective marginal regions.

8. A brake shoe according to claim 1, wherein said protuberances are disposed generally midway along the length of their respective marginal regions, said parts of said marginal regions being located at one end of said protuberances and at the other end of said protuberances said marginal regions being devoid of friction lining.

9. A brake shoe according to claim 1, wherein two said protuberances are provided in two intermediate portions of each of said marginal regions, said friction lining being provided in said intermediate portion.

10. A brake shoe according to claim 9, wherein one of the endmost portions of said marginal regions being covered with the friction lining and another of the endmost portions being devoid of friction lining.

11. A brake shoe according to claim 1, wherein said protuberances are substantially symmetrical with reference to a longitudinal center line of said brake shoe.

* * * * *